US008914018B2

(12) United States Patent
Tatman et al.

(10) Patent No.: US 8,914,018 B2
(45) Date of Patent: **\*Dec. 16, 2014**

(54) SYSTEM AND METHOD FOR MEASURING USER BEHAVIOR AND USE OF MOBILE EQUIPMENT

(75) Inventors: Lance A. Tatman, Granite Bay, CA (US); Jerry J. Liu, Sunnyvale, CA (US); Glenn R. Engel, Snohomish, WA (US); Glen L. Purdy, Jr., Snohomish, WA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 1276 days.

This patent is subject to a terminal disclaimer.

(21) Appl. No.: 11/397,141

(22) Filed: Apr. 3, 2006

(65) Prior Publication Data

US 2007/0232290 A1    Oct. 4, 2007

(51) Int. Cl.
*H04W 24/00* (2009.01)
*H04W 24/08* (2009.01)

(52) U.S. Cl.
CPC .............. *H04W 24/08* (2013.01); *H04W 24/00* (2013.01)
USPC ..... 455/423; 455/67.11; 455/425; 455/422.1; 370/252; 370/254

(58) Field of Classification Search
USPC ........... 455/423, 418, 67.11, 433, 426.1, 428, 455/466, 557, 427, 425, 422.1; 380/249; 370/335, 328, 252, 254; 379/100.17
See application file for complete search history.

(56) References Cited

U.S. PATENT DOCUMENTS

| | | | |
|---|---|---|---|
| 5,625,668 A | 4/1997 | Loomis et al. | |
| 5,805,666 A | 9/1998 | Ishizuka et al. | |
| 5,987,306 A | 11/1999 | Nilsen et al. | |
| 6,088,588 A | 7/2000 | Osborne | |
| 6,163,701 A * | 12/2000 | Saleh et al. | 455/456.2 |
| 6,185,409 B1 * | 2/2001 | Threadgill et al. | 455/12.1 |
| 6,308,071 B1 | 10/2001 | Kalev | |
| 6,434,364 B1 | 8/2002 | O'Riordain | |
| 6,687,772 B1 | 2/2004 | Eidson | |
| 7,043,237 B2 | 5/2006 | Snyder et al. | |
| 7,209,710 B2 | 4/2007 | Burch et al. | |
| 7,257,397 B2 * | 8/2007 | Shamoon et al. | 455/419 |

(Continued)

FOREIGN PATENT DOCUMENTS

EP          1328133 A2 *  7/2003
JP          2001127693     5/2001

OTHER PUBLICATIONS

Authors: Zappala, G., Alberotanza, L. and Crisafi, E.; Title: Assessment of Environmental Conditions Using Automatic Monitoring Systems; Date: Sep. 13-16, 1999; vol. 2; pp. 796-800.*

(Continued)

*Primary Examiner* — Mahendra Patel

(57) ABSTRACT

In a communication network architecture including mobile equipment that employs multiple functions selectable for use by the user, the functions having respective measurable parameters, a service provider monitors the user's behavior with, and use of, the mobile equipment. An agent, such as software installed on-board the mobile equipment, measures parameters that are related to the user's behavior and use of the mobile equipment, and communicates the measured parameters to the service provider, over the communication network. The agent detects change of such user behavior and use, and accordingly changes parameters to measure and report on.

26 Claims, 2 Drawing Sheets

(56) References Cited

U.S. PATENT DOCUMENTS

| | | | |
|---|---|---|---|
| 7,315,739 | B2 | 1/2008 | Burch et al. |
| 7,868,780 | B2 | 1/2011 | Engel et al. |
| 8,374,599 | B2 | 2/2013 | Tatman et al. |
| 8,762,076 | B2 | 6/2014 | Engel et al. |
| 2001/0041655 | A1 | 11/2001 | Xanthos et al. |
| 2001/0049263 | A1 | 12/2001 | Zhang |
| 2002/0055790 | A1* | 5/2002 | Havekost ............ 700/80 |
| 2002/0069037 | A1* | 6/2002 | Hendrickson et al. ....... 702/186 |
| 2002/0186701 | A1* | 12/2002 | Kaplan et al. ............ 370/252 |
| 2002/0194289 | A1 | 12/2002 | Engel et al. |
| 2003/0200059 | A1* | 10/2003 | Ignatowski et al. ........ 702/186 |
| 2004/0203434 | A1* | 10/2004 | Karschnia et al. ........ 455/67.11 |
| 2004/0236547 | A1* | 11/2004 | Rappaport et al. ............ 703/2 |
| 2005/0049765 | A1* | 3/2005 | Chetia et al. ............ 701/29 |
| 2005/0130675 | A1 | 6/2005 | Burch et al. |
| 2005/0136947 | A1* | 6/2005 | Llombart-Juan et al. .. 455/456.3 |
| 2005/0260973 | A1* | 11/2005 | van de Groenendaal ..... 455/411 |
| 2005/0267957 | A1 | 12/2005 | Eidson et al. |
| 2005/0268113 | A1* | 12/2005 | Mahone et al. ............ 713/189 |
| 2006/0069766 | A1 | 3/2006 | Hamilton et al. |
| 2006/0234698 | A1* | 10/2006 | Fok et al. ............ 455/425 |
| 2006/0259277 | A1* | 11/2006 | Fantana et al. ............ 702/183 |
| 2007/0032229 | A1* | 2/2007 | Jones ............ 455/419 |
| 2007/0041330 | A1* | 2/2007 | Bostica et al. ............ 370/252 |
| 2007/0130306 | A1 | 6/2007 | Ofel |
| 2007/0179792 | A1* | 8/2007 | Kramer ............ 705/1 |
| 2007/0247366 | A1* | 10/2007 | Smith et al. ............ 455/456.6 |

OTHER PUBLICATIONS

Notice of Allowance mailed Oct. 10, 2012 in U.S. Appl. No. 11/397,082, filed Apr. 3, 2006.

\* cited by examiner

SYSTEM AND METHOD FOR MEASURING USER BEHAVIOR AND USE OF MOBILE EQUIPMENT

BACKGROUND OF THE INVENTION

The invention relates to the field of telecommunications, and particularly to wireless communication networks. Among other areas, it has applicability to networks such as GPRS and IDEN, and networks according to the IEEE 802.11 standard.

In a typical communications architecture, users are coupled for communication with one or more nodes, such as base stations, servers, etc., which, in turn, are coupled for communication with public communication networks such as the Internet, and which support technology coverage areas within the network. Communications between such users pass through their respective base stations, and across the public networks. Such users employ mobile equipment, such as laptop or other portable computers, cellular telephones, etc.

A given piece of mobile equipment is characterized in terms of its functions, application programs, user-selectable options, etc., that the user has to choose from. As the user uses the mobile equipment, there is potentially a lot of data regarding the user's behavior with, and use of, the equipment. This can include, for instance, information about which on-board applications the user uses, the time of day and the length of time of a session in which the user uses an application, statistics regarding which functions are frequently, or infrequently, used, consumer travel patterns and even consumer associations with other subscribers by noting proximity to other subscribers, etc.

Various sets of operating parameters are associated with the respective user-selectable functions, etc. A service provider supporting a given service or mobile device will need access to data regarding its customer's use of the available functions, etc. However, service providers conventionally have very limited or no visibility to data regarding consumer behavior and their use of the devices.

The service provider conventionally accesses data about its customers, and their use of mobile equipment, by monitoring the various system infrastructure components at the base stations and elsewhere in the network. Service providers conventionally have had to conduct statistical analysis of these base station measurements to infer such user behavior, use of available functions, etc. Service providers conduct surveys of their customers to understand, for instance, customer experience, device use and service level both inside and outside of their home network. Test labs are also set up to simulate the expected environments.

However, these methods have had the drawback that they cannot directly measure customer experience. Service providers conventionally have very limited or no visibility into their customers' use of the mobile equipment. The service providers need information on such performance, in order to handle problems, and otherwise to be responsive to their customers' needs. The service provider's inability to obtain information directly reflective of the system's performance, as the user experiences it, disadvantageously limits the service provider's ability to provide the customer with effective support.

SUMMARY OF THE INVENTION

The customer's mobile equipment includes an agent, such as a software agent installed on-board the mobile equipment, that measures parameters related to the user's use of the various available functions, related to the user's behavior, etc. The mobile equipment transmits the measured parameters, through the communication network, to the service provider.

The service provider thus has direct access to the performance of the system from the customer's perspective, and is able to use that information to understand customer device use, and to improve service to the customer. Service providers can have real-time or near real-time data available to understand their customer's experience, even when the customer is roaming on another network technology.

Further features and advantages of the present invention, as well as the structure and operation of preferred embodiments of the present invention, are described in detail below with reference to the accompanying exemplary drawings.

GLOSSARY

For the description of the present invention, the following terms shall have the meanings here set forth:

"Agent" means a software program or other operational entity, for installation and operation on mobile equipment, that performs functions related to gathering parameter data, communicating with a remote entity such as a home service provider, sending the gathered parameter data, and receiving communications from the remote entity. An agent may be a piece of autonomous or semi-autonomous proactive and reactive, computer software residing on the mobile device. Many individual communicative software agents may form a multi-agent system.

"Application" means a software program which is installed for operation on mobile equipment, for use by the user in connection with the user's operation of the mobile equipment, for instance to enable the user to employ services made available by the home service provider.

"Base Station" means a network node, server, etc., generally provided and operated by a service provider, for facilitating user communication over a communication network.

"Customer" means an individual or other party who possesses communication equipment, such as a cell phone or laptop computer, and who subscribes with a service provider for network communication services. The terms "user" and "mobile equipment user" are used interchangeably with "customer."

"Home service provider" means, with reference to a given customer, a service provider with which the customer has a subscription for network communication service.

"Mobile equipment" means a piece of equipment, owned or possessed by a customer, having capability of communicating over the communication network, and which the customer can, pursuant to the customer's use of the mobile equipment, transport the mobile equipment from place to place and use it in those respective places. The terms "mobile device" and "mobile equipment" are used interchangeably with "mobile equipment."

"Networking technology" means a communication technology, standard, protocol, format, etc, which a given service provider employs to enable communication over a communication network. Examples of networking technologies include General Packet Radio Service (GPRS) and Integrated Enhanced Digital Network (IDEN).

"Service provider" means a party which maintains equipment and means for transmitting and receiving communications over a communication network, and which offers subscriptions to customers, pursuant to which the customers utilize the service provider's equipment and means for transmitting and receiving, to communicate over the communication network.

DETAILED DESCRIPTION

Figure 1:
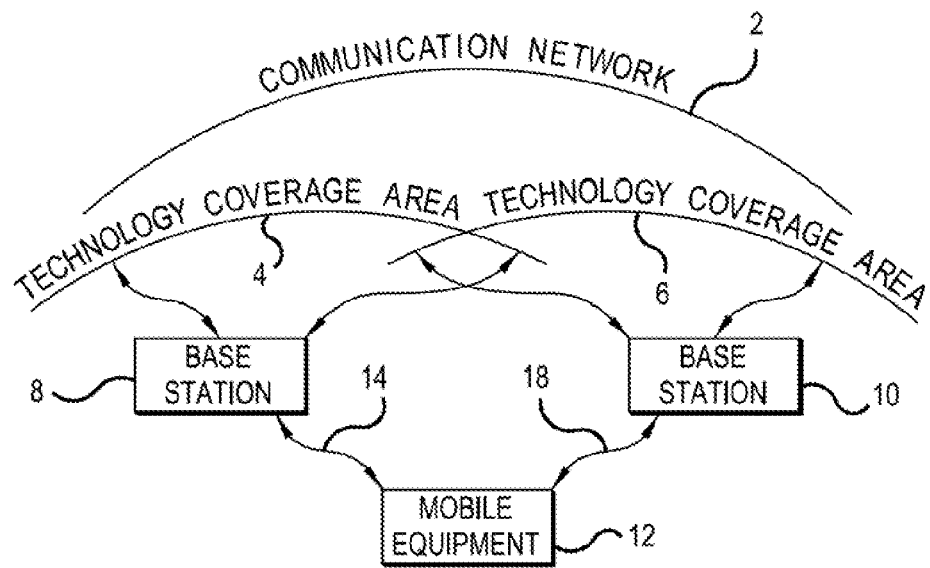
FIG. 1 is a block diagram showing an example of a broadband communications architecture, within which embodiments of the invention are practiced.

An example of an environment, in which various embodiments of the invention may be practiced, is illustrated by the block diagram of FIG. 1. A communication network 2 covers a region, such as a geographical region, over which first and second service providers provide coverage within respective technology coverage areas 4 and 6. Service provider server equipment, shown as base stations 8 and 10, are provided, within the respective technology coverage areas 4 and 6, to facilitate user communications. Thus, for instance, a customer of the first service provider, while located within the first service provider's technology coverage area 4, communicates with the base station 8 for access to the communication network 2 by means of a wireless or other communication link 14.

For the purpose of describing the invention, the first service provider will be referred to as the "home service provider," as per the definition in the Glossary, above.

The customer employs mobile equipment, generally shown as mobile equipment 12. The mobile equipment 12 communicates, for instance, through a link 18 to the base station 10, and over the communication network 2 to the home service provider. The mobile equipment 12 includes, among its various possible embodiments, a processor, memory, and a wireless communication interface. For instance, the mobile equipment 12 might include a laptop computer, cell phone, handheld "personal digital assistant" unit, or wireless transducer.

A conventional system which takes measurements from the base stations, will provide a severe under-sampling, in both time and space, of the consumer's behavior with respect to use of the mobile equipment 12's performance. Also, such conventional methods did not provide measurements from a customer perspective. That is, the measurements available to the service provider were not necessarily accurately reflective of the performance the mobile equipment 12 actually experienced.

Conventional methods of collecting consumer behavior which rely on verbal or written feedback from the consumer are costly, often inaccurate and cannot provide objective measurements and result again in a sever under-sampling, in both time and space of the consumer's behavior with respect to use of mobile equipment 12.

In one embodiment of the invention, measurements are made at the location where the customer is, and at the time when the customer is using the device. The measurements are taken at, or on-board, the mobile equipment 12. Thus, the service provider has clear visibility of their customer's experience, as the customer makes use of different applications. As a consequence, a much better representation of customer behavior is provided, than with conventional systems, which do not make this available to the service providers.

The mobile equipment 12 further includes means, shown as an agent 13, for measuring parameters, changing the parameters to be measured, and preparing and sending parameter measurement reports. Embodiments of the agent 13 are described in detail herebelow.

Figure 2:
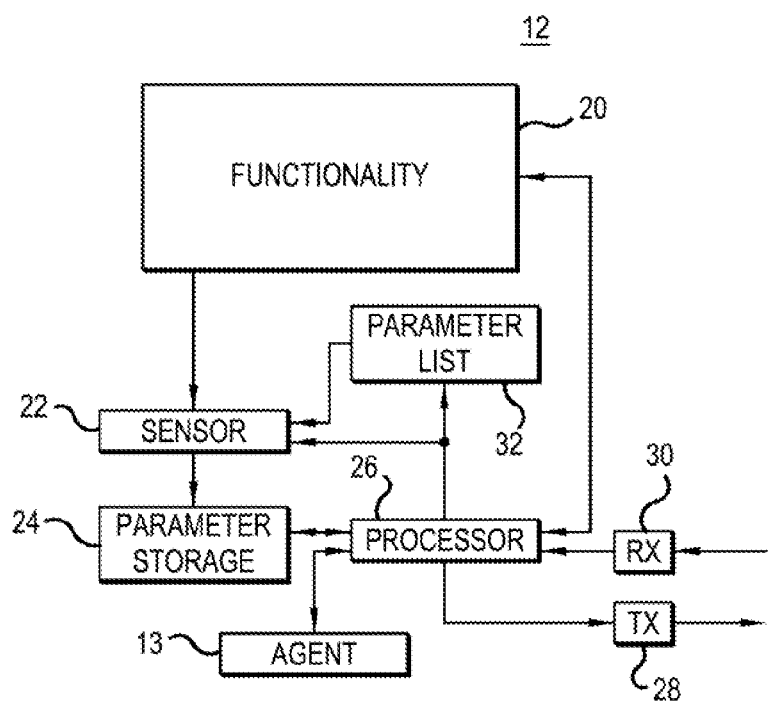
FIG. 2 is a block diagram showing a more detailed implementation of a piece of mobile equipment in accordance with an embodiment of the invention.

FIG. 2 is a block diagram of the piece of mobile equipment 12 of FIG. 1, such as a laptop computer or cell phone, illustrating one embodiment of the agent of the invention.

The mobile equipment 12 has a general functionality 20, whose nature depends on what type of equipment it is. For instance, if the mobile equipment 12 is a laptop computer, its general functionality 20 will include data storage and processing capability, a user interface, etc. A cell phone's general functionality 20 would include voice telecommunications. The user interface is not separately shown in FIG. 2, but is understood generally to be part of the general functionality 20.

The mobile equipment may also possess the ability to identify its location either grossly or with precision. The mobile device may have built in GPS capability or it may have support from a server based location system, or, it may only be able to grossly identify its position based on a piece of information like the cell ID or other base station identification method.

As the mobile equipment 12 operates, its operating parameters are sensed by a sensor 22, and stored in parameter storage 24. A processor 26 handles the parameters, and transmits them, through a transmitter including a transmit interface 28, over the communication network. The sensor 22 can include a hardware sensor, a software implementation for obtaining the sensed parameter values, or a suitable combination of both.

In another embodiment of the invention, a receive interface 30 receives signals from a user interface, which may, for instance, include behavior by the user, for instance selection by the user of an available service. Alternatively, such command signals can come from the user interface portion of the general functionality 20, when the user enters a command to select a service. The signals are provided to the processor 26, which interprets the signals appropriately, to identify the user behavior. The processor 26 then accesses a parameter list 32, which contains sets of parameters that are appropriate for various user behavior/activities, user-selectable applications, etc. The processor 26 then configures the sensor 22, to receive the sensed parameter signals that are appropriate for the detected user behavior. In so doing, the processor 26 serves as a selector for selecting parameters for measurement.

The agent 13, in one embodiment, is implemented as software, and is installed on the mobile equipment 12, for instance for execution by the processor 26. An embodiment of the agent 13 includes the following:

A. Software agent installed or installable on the customer device
      1. Agent is capable of communicating with a home provider's server.
      2. Agent is capable of storing measurements for some period of time.
      3. Agent is capable of making measurements useful to the home provider.
   B. Server to configure agents and collect data.

Figure 3:
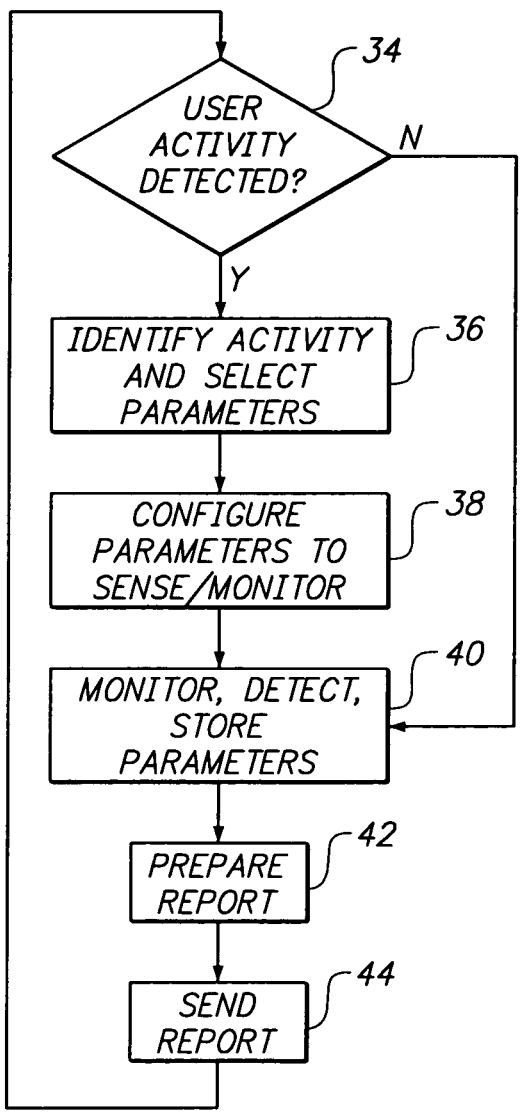
FIG. 3 is a flowchart showing operation of a method according to an embodiment of the invention.

FIG. 3 is a block diagram of a method of operation, according to an embodiment of the invention in which this functionality is performed by the agent 13.

In an activity (34), the agent 13 tests whether any user activity has been detected. Such user activity can include user interface manipulation such as keystrokes, mouse or joystick movement, touch screen contact, etc. It can also include activities not directly related to the user interface of the mobile equipment 12, such as motion detection, detection of change of velocity technology coverage area or service provider, light level, etc. Depending on the particular nature of the mobile equipment 12, a wide variety of such parameters might be of interest to the home service provider.

In one embodiment of the invention, the agent 13 operates in conjunction with the mobile equipment 12's operating system, application software, etc. to determine when a sequence of user interface activities is completed, to indicate a complete command such as entering text, typing or keying in a command, etc. where such a sequence of activities is used to initiate a service or function of the motile equipment 12, it will sometimes be the case that entry of the command, to start up the application, is one of the parameters to be monitored and reported on.

Where such activity has been detected, the agent 13 identifies the activity and selects parameters (36) which are appropriate to monitor, given that such activity has taken place. This may be done, for instance, by having the processor 26 consult the parameter list 32. The agent 13 configures the mobile equipment 12 to sense and monitor the parameters (38). The agent 13 monitors the parameters, and detects and stores the detected parameter values (40).

As the user selects various available activities, applications, etc., the agent 13 automatically switches over to a configuration appropriate for the user behavior, by configuring itself (38) to make measurements of the parameters appropriate for the selected service (40). The agent 13 may take measurements of the user's behavior and selected activities passively, or it may initiate the service itself and generate active measurements. The agent 13 is capable of being programmed to initiate and test new services, changing the parameter measurements to be appropriate for the service being used. Assuming a service provider has already installed software agents on its customer devices, the agent 13 can be configured to make measurements continuously at intervals, or do so when the customer uses the device. For example, measurements that may be taken by an agent within a GPRS network include, but are not limited to:

- Length of time software applications are in the foreground (applications such as a Web browser, an e-mail tool, phone, etc.)
- General Packet Radio Service (GPRS) state
- Packet Data Protocol (PDP) state
- Transmission Control Protocol (TCP) Cold Connect time
- TCP warm connect time
- E-mail one-way delay
- Wireless Application Protocol (WAP) and HyperText markup language (HTML) page download time
- User Datagram Protocol (UDP) cold round trip time
- UDP warm round trip time
- Short Message Service (SMS) and/or Multimedia Message Service (MMS) one-way delay
- TCP transmit rate
- TCP receive rate
- Signal strength in dBm
- Percentage of battery power remaining
- Absolute radio frequency channel number (ARPCN)
- Base station identity code (BSIC)
- Cell ID
- Routing area code (RAC)
- Time and/or date
- Geographical location
- Keys pressed
- Applications Used
- Elapsed Time Specific Applications Used
- Time/Date Specific Applications Started/Stopped
- Features of Specific Applications Used
- Device Menu Items Used
- Location at which Specific Applications Used
- External Device Connected to Mobile Device, i.e. Blue Tooth Headset
- Time/Date/Location External Device Connected of Mobile Device
- Aborted Call Attempts
- Call Establishment Errors
- Data Connection Attempts
- Data Connection Attempt Errors
- Time/Date/Location for Call and Data Connection Attempts and Errors Different measurements can be taken, and would be needed for different applications.

Data gathered may also be used to monitor consumer behavior in the sense of movement, location and the use of applications.

In another embodiment, the agent 13 detects a failed user attempt to employ a home service provider service, a function of the mobile equipment 12, etc. The agent 13 reports on such failure to the home service provider, as described above. The report may also include the location, date, time, etc., of the failed attempt.

Measurements can be made of events that do not, in and of themselves, involve communication over the network. For instance, a user may make use of a laptop computer application such as a notepad. Previous methods provided no way to gather this type of information in a scalable manner. This invention gives the service provider clear visibility of their customers behavior with respect to the use of the mobile equipment 12.

Sensed parameters from the mobile equipment 12 are reported (42 and 44) from the mobile equipment 12 to the home service provider, via its base station 8 and the communication network 2, or if the customer is in another service provider's network, via base station 10 and the communication network 2. Preparing the report (42) may be done at specified time intervals, in response to predetermined values of predetermined parameters when the predetermined values are sensed, in response to a request from the service provider's server equipment, accumulation of a predetermined quantity of parameters, the detection of a change in network technology such as by crossing a technology coverage area boundary, a change in observed "normal" consumer behavior or at other times which the system architect may choose The agent 13 prepares reports of the parameters it has monitored and detected (40). The agent 13 sends the parameter reports (42) at specified intervals, in response to requests from the home service provider received over the communication network 2 through the receive interface 30, as the parameters are sensed, etc.

For instance, the parameters may be accumulated until one of the above-stated conditions is met. If it is not yet time to send the parameter report, then parameter sensing continues. If it is time to send a report, then the agent 13 prepares a parameter report (42). For instance, in one embodiment the processor 26 prepares the parameter report, by following its pre-programmed instructions and/or the agent 13's configuration settings. Preparing the parameter report may include packaging the sensed parameters into a data packet for transmission. pre-processing the parameters, etc. Pre-processing may include summarizing the sensed parameters, calculating statistics, averaging, flagging noteworthy sensed parameter values, etc.

The parameter report is then transmitted (44), for instance through the transmit interface 28. The agent 13 continues sensing the parameters, storing and accumulating the sensed parameters, etc., by again executing the activity 40.

As the customer goes about his/her business, their mobile device will be taking measurements and either storing them on the device for later transmission to the Operational Support System (OSS) server, or it will be transmitting the measurements at particular intervals, using the network 2 as the communications medium.

As the customer starts up or shuts down different applications, moves to a different area, changes observed "normal" behavior, etc., the device automatically switches over to make the appropriate measurements for the new running applications or situation.

Conventionally, the provider would normally be blind to the performance the customer is experiencing. However, because the measurements are being taken from the mobile equipment 12, the customer is independent of the network, and the measurements can be provided back to the home service provider's system. This data may be used by the home service provider for many different applications, such as verification of network service performance or planning for extension to network coverage. The data could be used to study the user interface on different model phones, or to detect regional trends in service usage. It may also be used for analysis of application usage behavior, for instance email may be used very infrequently in the city during the work day, but the service provider may observe an increase in use of email in the suburbs in the evening when workers are away from the office. The service providers marketing departments could make use of the data about typical application usage behavior to target specific consumers or groups of consumers for special pricing on those application that are most used.

Because these agents may be employed on a large number of mobile devices, some implementations likely will encounter issues with scaling. Conventionally, installing agents on all of a service provider's customer devices would lead to a solution that could not scale. Also, because the agents will reside on consumer devices, there will be issues with privacy. Systems and methods which include embodiments of the present invention may advantageously address these issues, by employing techniques, such as those disclosed in the patent applications here listed:

Ser. No. 10/047,240 Method and System for Improved Monitoring Measurement and Analysis of Communication Networks Utilizing Dynamically and Remotely Configurable Probes U.S. patent application publication Ser. No. 2005/0130675 Wireless Probe Management System U.S. Pat. No. 7,868,780 Technique for Management Allowing Anonymous Probe Configuration Allowing Anonymous Probe Identity U.S. Pat. No. 8,762,076 Selective Distribution Of Measurement Device Behavior In a Loosely Coupled Autonomous System U.S. patent application publication Ser. No. 2002/0194289 Configuring Devices Using Server Responses U.S. Pat. No. 7,209,710 Bandwidth Management Using Statistical Measurement U.S. Pat. No. 7,315,739 Systems and Methods for Measurement and/or Control Using Mobile Probes U.S. patent application publication Ser. No. 2005/0267957 Methods and devices for configuring mobile applications based on specifications defining regions in multidimensional coordinates.

U.S. Pat. No. 6,687,772 Transducers with Electronic Data Sheets That Enable Transducer Access Using Multiple Type of Transducer Object Models U.S. patent application publication Ser. No. 2006/069766 Method and System for Treating Events and Data Uniformly Although the present invention has been described in detail with reference to particular embodiments, persons possessing ordinary skill in the art to which this invention pertains will appreciate that various modifications and enhancements may be made without departing from the spirit and scope of the claims that follow.

What is claimed is:

1. A parameter measurement system, for measuring parameters accessible by mobile communications equipment which communicates over a communication network from a site which is geographically remote from other components of the communication network, the mobile communications equipment employing multiple functions selectable for use by the user, the system comprising:
    an agent, included within the mobile communications equipment, which:
    (i) a transducer for sensing user behavior;
    (ii) sets of parameters suitable for different network technologies, including a parameter set from which parameters are selected for measurement based on the sensed user behavior:
    (iii) means for measuring predetermined parameters of operation of the uses of the mobile equipment at the geographically remote site by the user, the measuring means including means for associating, with a parameter measurement, at least one of (i) a date, and (ii) a time, of the parameter measurement;
    (iv) means for changing measurement parameters to make parameter measurements appropriate for a detected change of use of the mobile communications equipment; and
    (v) a transmitter for transmitting measured parameters over the communication network, wherein (a) the transducer comprises (i) a user interface sensor for sensing user manipulation of a user input interface, and (ii) an interpreter for interpreting when user manipulations of the user input interface represent a command for employing a function of the mobile communications equipment; and (b) the agent configures parameter sensing responsive to the representation interpreted by the interpreter.

2. A system as recited in claim 1, wherein the mobile communications equipment includes a processor, memory, and a wireless communication interface.

3. A system as recited in claim 2, wherein the mobile communications equipment includes one of (i) a cellular telephone, (ii) a portable computer, (iii) a handheld personal digital assistant unit, and (iv) a wireless transducer.

4. A system as recited in claim 1, wherein the agent includes parameter storage for accumulating measurements of the parameters, and storing the measurements as the measurements accumulate.

5. A system as recited in claim 4, wherein the agent stores the accumulated measurements of the parameters for one of (i) a predetermined period of time, (ii) until a predetermined quantity of parameters have been accumulated, and (iii) until a change in user behavior is detected.

6. A system as recited in claim 1, wherein the agent further comprises a processor for preprocessing the measured parameters before transmitting the measured parameters.

7. A system as recited in claim 1, wherein the interpreter interprets the user manipulations of the user input interface to determine that the user is commanding an application program to start up.

8. A system as recited in claim 1, wherein (i) the mobile communications equipment includes an operating system that interprets user manipulation of a user input interface as a command for employing a function of the mobile communications equipment; and (ii) the interpreter operates in conjunction with the operating system to interpret when user manipulations of the user input interface represent a command for employing a function of the mobile communications equipment.

9. A system as recited in claim 1, wherein the agent further comprises a transmitter for transmitting the selected parameters over the communication network, responsive to a received request for transmission of the parameters.

10. A system as recited in claim 1, wherein the agent further comprises a selector for selecting parameters for measurement, responsive to one of (i) a received command to do so; and (ii) an elapsed time.

11. A system as recited in claim 1, further comprising a service provider which is coupled for communication with the mobile communications equipment over the communication network, and which receives the measured parameters.

12. A system as recited in claim 11, wherein the service provider includes a node, coupled to the communication network to receive the measured parameters transmitted from the agent.

13. A system as recited in claim 1, wherein the measuring means includes means for detecting a failed user attempt to employ one of (i) a home service provider service and (ii) a mobile communications equipment function.

14. A method for measuring parameters accessible by mobile communications equipment which communicates over a communication network from a site which is geographically remote from other components of the communication network, the mobile communications equipment employing multiple functions selectable for use by the user, the method being performed by the mobile equipment and comprising:
  (i) sensing user behavior, wherein the mobile equipment includes sets of parameters including a parameter set from which parameters are selected for measurement based on the sensed user behavior;
  (ii) measuring predetermined parameters of operation of the uses of the mobile communications equipment at the geographically remote site by the user, the measuring including associating, with a parameter measurement, at least one of (i) a date, and (ii) a time, of the parameter measurement;
  (iii) changing measurement parameters to make parameter measurements appropriate for a detected change of use of the mobile communications equipment; and
  (iv) transmitting measured parameters over the communication network, wherein: (a) sensing includes (i) sensing user manipulation of a user input interface, and (ii) interpreting when user manipulations of the user input interlace represent a command for employing a function of the mobile communications equipment; and
  (b) the method further comprises configuring parameter sensing responsive to the representation interpreted by the interpreting.

15. A method as recited in claim 14, wherein the mobile communications equipment includes a processor, memory, and a wireless communication interface.

16. A method as recited in claim 15, wherein the mobile communications equipment includes one of (i) a cellular telephone, (ii) a portable computer, (iii) a handheld personal digital assistant unit, and (iv) a wireless transducer.

17. A method as recited in claim 14, further comprising accumulating measurements of the parameters, and storing the measurements as the measurements accumulate.

18. A method as recited in claim 17, wherein storing includes storing the accumulated measurements of the parameters for one of (i) a predetermined period of time, (ii) until a predetermined quantity of parameters have been accumulated, and (iii) until a change in user behavior is detected.

19. A method as recited in claim 14, further comprising preprocessing the measured parameters, and transmitting the measured and preprocessed parameters.

20. A method as recited in claim 14, wherein interpreting includes interpreting the user manipulations of the user input interface to determine that the user is commanding an application program to start up.

21. A method as recited in claim 14, wherein (i) the mobile communications equipment includes an operating system that interprets user manipulation of a user input interface as a command for employing a function of the mobile equipment; and (ii) the interpreting takes place in conjunction with operation of the operating system, to interpret when user manipulations of the user input interface represent a command for employing a function of the mobile communications equipment.

22. A method as recited in claim 14, further comprising transmitting the selected parameters over the communication network, responsive to a received request for transmission of the parameters.

23. A method as recited in claim 14, wherein the agent further comprises a selector for selecting parameters for measurement, responsive to one of (i) a received command to do so; and (ii) an elapsed time.

24. A method as recited in claim 14, wherein:
  a service provider is coupled for communication with the mobile communications equipment over the communication network; and
  the method further comprises the service provider receiving the measured parameters.

25. A method as recited in claim 24, wherein:
  the service provider includes a node, coupled to the communication network; and
  the method further comprises the node receiving the measured parameters transmitted from the agent.

26. A method as recited in claim 14, wherein the measuring includes detecting a failed user attempt to employ one of (i) a home service provider service and (ii) a mobile communications equipment function.

* * * * *